US010101154B2

(12) United States Patent
Swaminathan et al.

(10) Patent No.: US 10,101,154 B2
(45) Date of Patent: Oct. 16, 2018

(54) SYSTEM AND METHOD FOR ENHANCED SIGNAL TO NOISE RATIO PERFORMANCE OF A DEPTH CAMERA SYSTEM

(71) Applicants: Krishna Swaminathan, Santa Clara, CA (US); Anders Grunnet-Jepsen, San Jose, CA (US)

(72) Inventors: Krishna Swaminathan, Santa Clara, CA (US); Anders Grunnet-Jepsen, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 227 days.

(21) Appl. No.: 14/976,629

(22) Filed: Dec. 21, 2015

(65) Prior Publication Data
US 2017/0180654 A1    Jun. 22, 2017

(51) Int. Cl.
| H04N 13/00 | (2018.01) |
| G01C 3/08 | (2006.01) |
| G01B 11/25 | (2006.01) |
| H04N 13/02 | (2006.01) |
| G02B 13/16 | (2006.01) |

(52) U.S. Cl.
CPC ............ *G01C 3/08* (2013.01); *G01B 11/2518* (2013.01); *H04N 13/025* (2013.01); *H04N 13/0253* (2013.01); *G02B 13/16* (2013.01)

(58) Field of Classification Search
CPC ...... H04N 5/225; H04N 5/235; H04N 5/2256; H04N 5/2353; H04N 5/2354; H04N 5/2258; H04N 5/23245; H04N 5/353; H04N 13/0271; H04N 13/0239; H04N 2013/0081; G06F 3/01; G09G 2320/103; G09G 2360/144
See application file for complete search history.

(56) References Cited

U.S. PATENT DOCUMENTS

| 7,965,754 B1 * | 6/2011 | Saint Clair ........... H01S 5/4031 372/50.12 |
| 9,151,830 B2 * | 10/2015 | Bridges ................ G01C 15/002 |
| 2003/0057355 A1 * | 3/2003 | Wang ....................... G01J 1/32 250/205 |

(Continued)

FOREIGN PATENT DOCUMENTS

WO    WO 2015-183550 A1    12/2015

OTHER PUBLICATIONS

International Search Report and Written Opinion; International Application PCT/US2016/055799; dated Jan. 19, 2017; 12 pages.

*Primary Examiner* — Frank Huang
(74) *Attorney, Agent, or Firm* — Womble Bond Dickinson (US) LLP

(57) ABSTRACT

A method and apparatus for enhancing the signal to noise ratio performance of a depth camera system are described. In one embodiment, the method includes exposing a portion of a pixel array of a rolling camera sensor, and activating a portion of a rolling projector to generate a portion of a projection pattern during the exposure of the portion of the pixel array. The method may also include capturing image data for the generated portion of the projection pattern with the exposed portion of the pixel array of the rolling camera sensor. Furthermore, the method may include performing depth reconstruction based, at least in part, on the captured image data.

14 Claims, 6 Drawing Sheets

(56) References Cited

U.S. PATENT DOCUMENTS

| | | | |
|---|---|---|---|
| 2009/0244482 A1* | 10/2009 | Elsner | A61B 3/1025 351/206 |
| 2010/0008588 A1* | 1/2010 | Feldkhun | G01B 11/2518 382/206 |
| 2010/0182311 A1 | 7/2010 | Kim | |
| 2011/0169915 A1 | 7/2011 | Bloom et al. | |
| 2012/0051588 A1* | 3/2012 | McEldowney | G03B 17/54 382/103 |
| 2012/0265479 A1* | 10/2012 | Bridges | G01C 15/002 702/135 |
| 2013/0147353 A1* | 6/2013 | Mandelboum | H05B 33/0851 315/119 |
| 2014/0241614 A1* | 8/2014 | Lee | H04N 13/004 382/154 |
| 2015/0002734 A1* | 1/2015 | Lee | H04N 5/2256 348/367 |
| 2015/0071524 A1* | 3/2015 | Lee | G06T 7/0075 382/154 |
| 2015/0281671 A1* | 10/2015 | Bloom | G01B 11/254 348/46 |

* cited by examiner

SYSTEM AND METHOD FOR ENHANCED SIGNAL TO NOISE RATIO PERFORMANCE OF A DEPTH CAMERA SYSTEM

FIELD

Embodiments of the present invention relate to the field of camera systems that perform three-dimensional (3-D) measurements; more particularly, embodiments of the present invention relate to enhancing the signal to noise ratio performance of a depth camera system.

BACKGROUND

Stereo depth cameras are well-known and are often used to measure a distance from an object. One such measurement device includes a projector and a camera. In such a device, the projector projects a known pattern image on an object (e.g., a scene), and an image of the object upon which the image is projected is captured by one or more cameras. From the captured images, depth information may be determined. One technique for determining depth in such devices is through the use of triangulation. Thus, images of objects are captured and measurements are taken to determine depth information.

The camera(s) in such depth camera systems, may be complementary metal-oxide semiconductor (CMOS) sensor based cameras. One type of CMOS sensor based camera utilizes a global shutter, which exposes all pixels of the CMOS sensor at a single time, much like a typical film-based camera system. CMOS sensors with global shutters are both expensive and can experience delays in processing image data because all of the CMOS sensor pixels are exposed at once. Another type of CMOS sensor based camera utilizes a rolling shutter, which sequentially exposes rows of pixels of the CMOS sensor, from top to bottom of the CMOS sensor.

Regardless of what type of CMOS sensor is used for the camera(s) in a depth camera system, which attempts to capture a projection pattern generated by the system's projector to assist in the determination of depth information for a capture scene, the CMOS sensors are subject to noise. In this case, noise is any light in a scene that is not generated by the camera system's projector, but which is in the camera's wavelength of interest. Increased noise will require a stronger signal generated from the projected pattern to achieve the required accuracy of depth determination. In certain environments, such as outdoors, the problem of noise is exacerbated because of the amount of ambient light of different wavelengths, especially uniform background infrared illumination. Therefore, it may become difficult to determine depth information for a scene using projector based stereo depth imaging systems.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
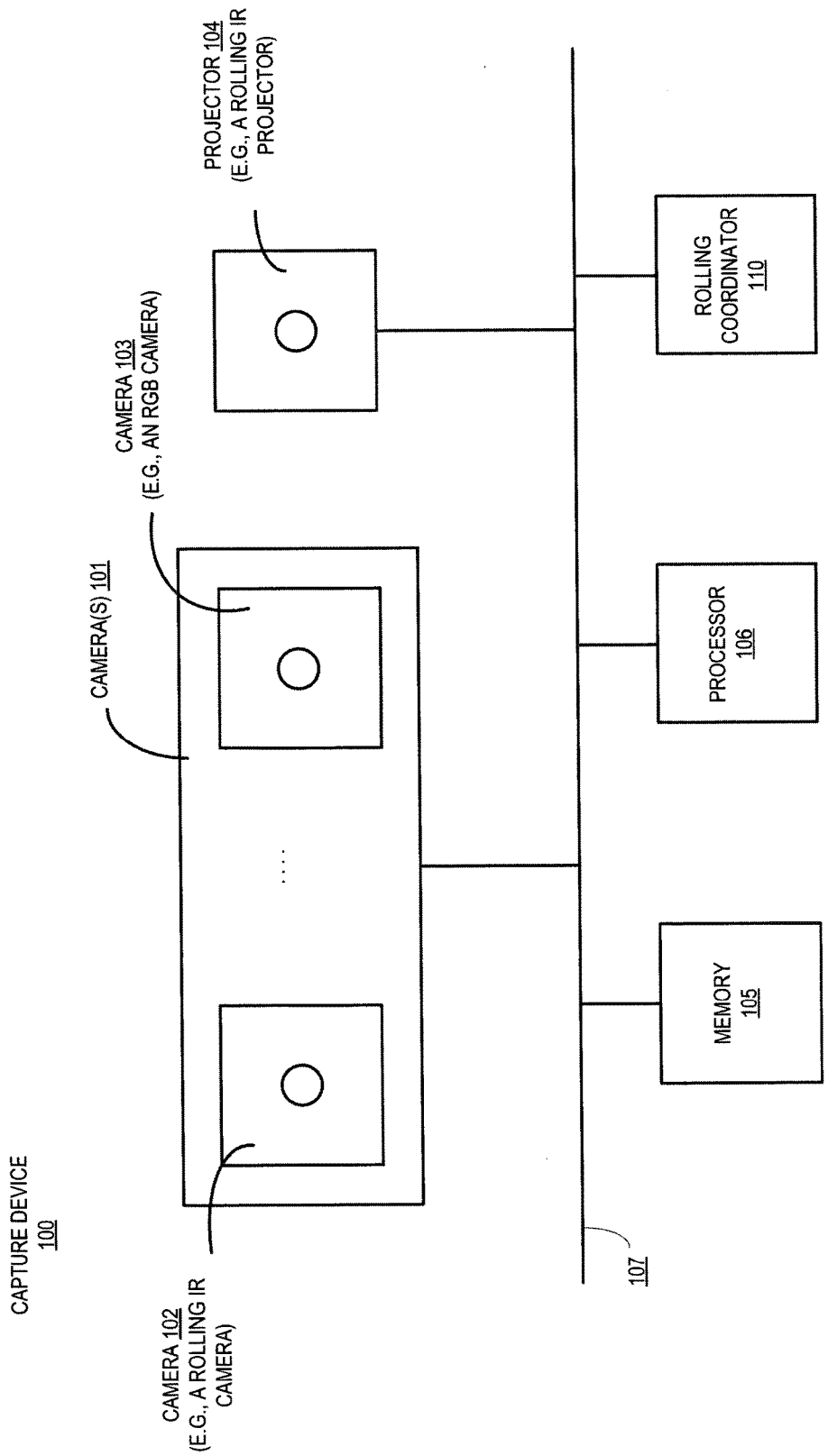
FIG. 1 illustrates one embodiment of a depth camera system for enhancing signal to noise ratio performance in a depth camera system.

FIG. 1 illustrates one embodiment of a depth camera system for enhancing signal to noise ratio performance in a depth camera system. In embodiments of an active coded light triangulation system, the system can include coded light range cameras, operated by projecting a one-dimensional binary ("black" and "white") pattern onto a scene, such that the produced binary code encodes the angle of the projection plane. Depth is then reconstructed by triangulation consisting of computing the intersection of an imaginary ray emanating from the camera with the plane emanating from the projector.

Referring to FIG. 1, capture device 100 may include a 3D scanner, a 3D camera or any other device configured for a 3D object acquisition. In some embodiments, as illustrated, capture device 100 includes an image capturing device 102 (e.g., a digital camera) and a projector unit 104, such as a laser projector or laser scanner, having a number of components. In some embodiments, digital camera 102 may comprise an infrared (IR) camera utilizing a rolling CMOS sensor, and the projector unit 104 may comprise a rolling IR laser projector, such as an embodiment of a vertical-cavity surface-emitting laser (VCSEL) projector.

Figure 3:
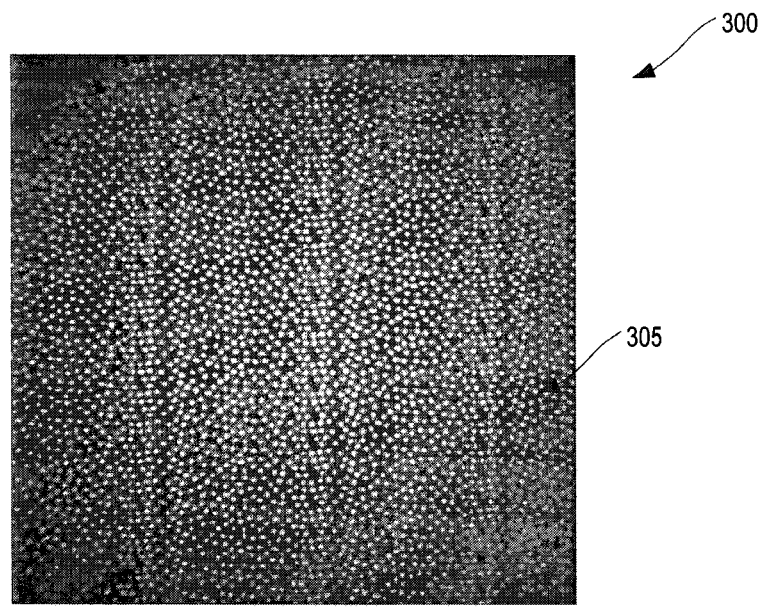
FIG. 3 illustrates an example projector pattern generated by one embodiment of a projector of a depth camera system.

Projector unit 104 is configured to project a light pattern as described herein and may comprise a one-dimensional coded projection pattern, such as the example projection pattern illustrated in FIG. 3. In one embodiment, the projection pattern 300 comprise one-dimensional coded light patterns 305, e.g., the patterns that may be described by one-dimensional or linear codes. The light projection patterns formed by the laser planes on a surface of the object may be received by image capturing device 102 and sensed (e.g., read) by a sensor of image capturing device 102. Based on the readings of the multiple scans of the light patterns accumulated during a sensing cycle of the sensor, capture device 100 may be configured to reconstruct the shape of the object.

In some embodiments, capture device 100 may further include another image capturing device, such as digital camera 103. In some embodiments, digital camera 103 may have a resolution that is different than that of digital camera 103. For example, digital camera 102 may be a multichromatic camera, such as red, green, and blue (RGB) camera configured to capture texture images of an object.

Capture device 100 may further include a processor 106 that may be in operative communication with the image camera component 101 over a bus or interconnect 107. Processor 106 may include a standardized processor, a specialized processor, a microprocessor, or the like that may execute instructions that may include instructions for generating depth information, generating a depth image, determining whether a suitable target may be included in the depth image, or performing other operations described herein.

Processor 106 may be configured to reconstruct the object based on the images captured by digital camera 102, for example, using geometry techniques or other techniques used for 3D image reconstruction. Processor 106 may be further configured to correct distortions in the reconstructed image of the object or depth calculations that may be caused, for example, by various external factors (e.g., temperature, dropping, bending, etc.).

Capture device 100 may further include a memory 105 that may store the instructions that may be executed by processor 106, images or frames of images captured by the cameras, user profiles or any other suitable information, images, or the like. According to one example, memory 105 may include random access memory (RAM), read only memory (ROM), cache, Flash memory, a hard disk, or any other suitable storage component. As shown in FIG. 1, memory component 105 may be a separate component in communication with the cameras 101 and processor 106. Alternatively, memory 105 may be integrated into processor 106 and/or the image capture cameras 101. In one embodiment, some or all of the components 102-106 are located in a single housing.

Processor 105, memory 104, other components (not shown), image capturing device 102, and projector unit 104 may be coupled with one or more interfaces (not shown) configured to facilitate information exchange among the above-mentioned components. Communications interface(s) (not shown) may provide an interface for device 100 to communicate over one or more wired or wireless network(s) and/or with any other suitable device. In various embodiments, capture device 100 may be included to or associated with, but is not limited to, a server, a workstation, a desktop computing device, or a mobile computing device (e.g., a laptop computing device, a handheld computing device, a handset, a tablet, a smartphone, a netbook, ultrabook, etc.).

In one embodiment, capture device 100 is integrated into a computer system (e.g., laptop, personal computer (PC), etc.). However, capture device 100 can be alternatively configured as a standalone device that could be coupled to such a computer system using conventional technologies including both wired and wireless connections.

In various embodiments, capture device 100 may have more or less components, and/or different architectures. For example, in some embodiments, capture device 100 may include one or more of a camera, a keyboard, display such as a liquid crystal display (LCD) screen (including touch screen displays), a touch screen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like. In various embodiments, capture device 100 may have more or less components, and/or different architectures. In various embodiments, techniques and configurations described herein may be used in a variety of systems that benefit from the principles described herein.

Capture device 100 may be used for a variety of purposes, including, but not limited to, being part of a target recognition, analysis, and tracking system to recognize human and non-human targets in a capture area of the physical space without the use of special sensing devices attached to the subjects, uniquely identify them, and track them in three-dimensional space. Capture device 100 may be configured to capture video with depth information including a depth image that may include depth values via any suitable technique including, for example, triangulation, time-of-flight, structured light, stereo image, or the like.

Capture device 100 may be configured to operate as a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the camera. In this example, capture device 100 includes an IR light projector 104, an IR camera 102, and a visible light RGB camera 103 that are configured in an array.

Various techniques may be utilized to capture depth video frames. For example, capture device 100 may use structured light to capture depth information. In such an analysis, patterned light (i.e., light displayed as a known pattern such as a grid pattern or a stripe pattern) may be projected onto the capture area via, for example, IR light projector 104. Upon striking the surface of one or more targets or objects in the capture area, the pattern may become deformed in response. Such a deformation of the pattern may be captured by, for example, the IR camera 102 and/or the RGB camera 103 and may then be analyzed to determine a physical distance from capture device 100 to a particular location on the targets or objects.

Capture device 100 may utilize two or more physically separated cameras that may view a capture area from different angles, to obtain visual stereo data that may be resolved to generate depth information. Other types of depth image arrangements using single or multiple cameras can also be used to create a depth image.

Capture device 100 may provide the depth information and images captured by, for example, IR camera 102 and/or the RGB camera 103, including a skeletal model and/or facial tracking model that may be generated by capture device 100, where the skeletal and/or facial tracking models, depth information, and captured images are used to, for example, create a virtual screen, adapt the user interface, and control an application.

In embodiments, capture device 100 may comprise a projector unit 104 (e.g., a rolling IR projector), a digital camera (e.g., a rolling IR camera) 102, another digital camera (e.g., multi-chromatic camera) 103, and a processor (controller) configured to operate capture device 100 according to the embodiments described herein. However, the above assembly configuration is described for illustration purposes only, and should not be limiting to the present disclosure. Various configurations of an assembly for a 3D object acquisition may be used to implement the embodiments described herein. For example, an assembly for a 3D object acquisition configured to enable the reconstructed object distortion corrections may include three digital cameras, two of which may be used to reconstruct a 3D image of an object, and the third camera (e.g. with a resolution that is different than those of the two cameras) may be used to capture images of the object in order to identify image distortions in the reconstructed object and to compensate for identified distortions.

In one embodiment, where projector unit 104 is a rolling IR projector and digital camera 102 is a rolling IR camera (e.g., utilizes a CMOS sensor with a rolling shutter), rolling coordinator 110 controls the rolling capabilities of the projection unit 104 for enhancing the signal to noise ratio performance of the capture device 100. In embodiments, rolling coordinator 110 is a processing logic that may comprise hardware (circuitry, dedicated logic, etc.), software (such as is run on a general purpose computer system, a dedicated machine, stored in memory 105 and executed by processor 106, etc.), firmware, or a combination thereof.

In one embodiment, rolling coordinator 110 is responsible for coordinating the activation of a portion of a projector 104 (e.g., rolling IR projector), which generates a portion of a projection pattern, with the portion of pixels that are exposed by the rolling shutter of camera 102 (e.g., a rolling shutter of a CMOS sensor). In one embodiment, IR projector 104 is a VCSEL laser projector, which is an on-chip semiconductor laser with a plurality of IR emission light sources arranged as an array, grid, columns, rows, etc., and which are perpendicular from the projection part of the VCSEL projector. In one embodiment, the VCSEL is integrated with a projection lens, which enables the surface of the VCSEL to be imaged onto a scene, and generate the projection pattern for depth reconstruction purposes. Furthermore, each emission source of VCSEL projector is individually addressable and can be individually controlled to provide pixel-level control of the output from each emission light source. For example, the emission of a VCSEL projector may be controlled by selectively activating individual laser emission sources (e.g., individual emission sources, rows of emission sources, groups of emission sources, etc.), as well as controlling the power supplied to selectively activated emission sources (e.g., to control brightness, create patterns of different intensities, etc.).

In one embodiment, a rolling shutter of camera 102 exposes a sequence of groups of pixels, such as rows of pixels from top to bottom of the CMOS sensor. In one embodiment, the exposure of groups of pixels of the CMOS sensor can be controlled and/or configured by rolling coordinator 110. Furthermore, it should be noted that other sequences and/or groupings could be exposed by a rolling shutter of the camera 102. In one embodiment, rolling coordinator 110 activates corresponding portions of the projector 104, such as activating corresponding rows of light emission sources of a VCSEL laser projector from top to bottom of an array of light emission sources.

Figure 4:
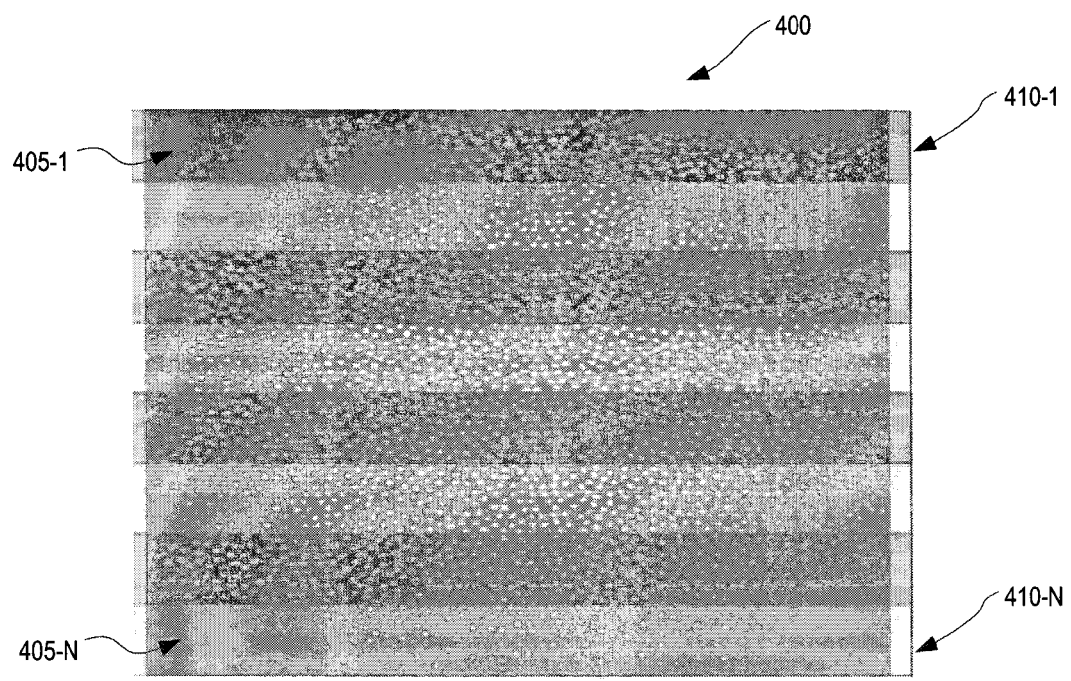
FIG. 4 illustrates one embodiment of an example projection pattern which can be generated by one embodiment of a rolling projector of a depth camera system.

FIG. 4 illustrates one embodiment of an example projection pattern which can be generated by one embodiment of a rolling projector of a depth camera system. In FIG. 4, a plurality of individually rows 405-1 through 405-N of the projection pattern may each be selectively generated by selectively activating corresponding rows of a rolling VCSEL projector (e.g., projector 104). In one embodiment, the activation of a grouping of light emission sources of the VCSEL projector, such as a row or group of rows, may be coordinated with the rolling exposure of rows of pixels of a camera (e.g., camera 102 having a rolling shutter) 410-1 through 410-N. That is, as the pixels of a rolling shutter of camera 102 are exposed to capture image data indicated by box 410-1, a corresponding portion 405-1 of a projection pattern may also be generated by activating a portion of a rolling VCSEL IR projector. As sequential portions of pixels of the CMOS sensor are exposed, in one embodiment, corresponding portions of a projection pattern are also generated by selectively activating the corresponding portions of the rolling VCSEL IR projector.

Returning to FIG. 1, in addition to controlling which portions of a rolling projector are selectively activated, rolling coordinator 110 further controls the power supplied to each portion of activated light emission sources a rolling projector (e.g., power supplied to emission sources of a VCSEL laser projector). In one embodiment, rolling coordinator 110 powers the portion of activated light emission sources of the VCSEL laser projector with the amount of power that would otherwise have been supplied to the entire VCSEL laser projector array. Since the total power that can be supplied to the VCSEL laser projector array is limited by an eye safety limit (e.g., a maximum power such that when a human eye is exposed to the light generated by the laser at the maximum power, the laser is not harmful to the human eye), in one embodiment, the rolling coordinator supplies this threshold level of power to the portion of activated light emission sources. Thus, for example, if a rolling VCSEL laser projector is configured to have 10 sequentially activated rows, each individual row may be supplied with up to all of the power that would have been supplied to the 9 non-activated rows. As a result, the power output of each individual row of the rolling IR projector is boosted by up to a maximum of the number of rows. In embodiments, the increased illumination enables the signal to background illumination noise to be improved over non-rolling systems due to the increased illumination intensity capacity, without consuming additional power.

In the embodiments discussed herein, the coordination of the activation of portions of a rolling projector, such as rows of light emission sources of a VCSEL laser projector, with exposed portions of a rolling camera, such as rows of pixels of a CMOS sensor exposed by a rolling shutter, also enables the signal to background illumination noise to be improved over non-rolling systems. The coordination of the rolling camera with the rolling projector will improve the signal to background illumination noise ratio by the ratio of an exposure time for capturing a portion of a projection pattern, to a frame time of a rolling CMOS sensor. For example, suppose that a CMOS sensor has 480 rows of pixels. Further, if the frame time of a CMOS sensor is assumed to be 33 milliseconds (i.e., 30 frames per second), and the exposure time of the rolling shutter is 1 millisecond, then the CMOS sensor with 480 rows will expose a rolling band of pixels with its rolling shutter that are 480/33 pixels tall, or approximately 14 total rows of pixels. When the same or slightly larger number of VCSEL light emission sources are controlled to turn on at the same/synchronized time as the exposed row of pixels, the signal to background illumination noise ratio is increased by 33 times (e.g., 33 times better robustness against background light/noise). Thus, the embodiments discussed herein for coordinating the rolling camera with the rolling projector can increase signal to noise performance as a function of the frame time of the rolling camera.

Figure 2:
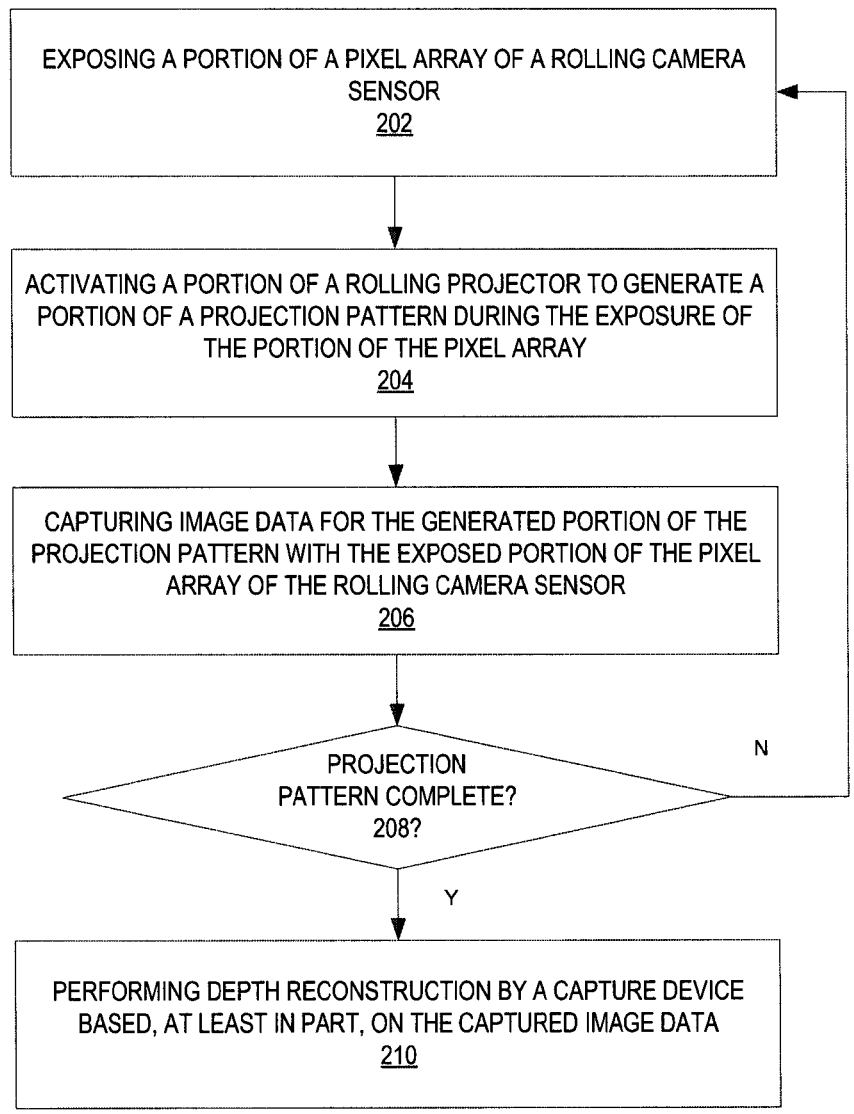
FIG. 2 is a flow diagram of one embodiment of utilizing a rolling projector in a depth camera system to enhance signal to noise ratio performance.
Figure 5:
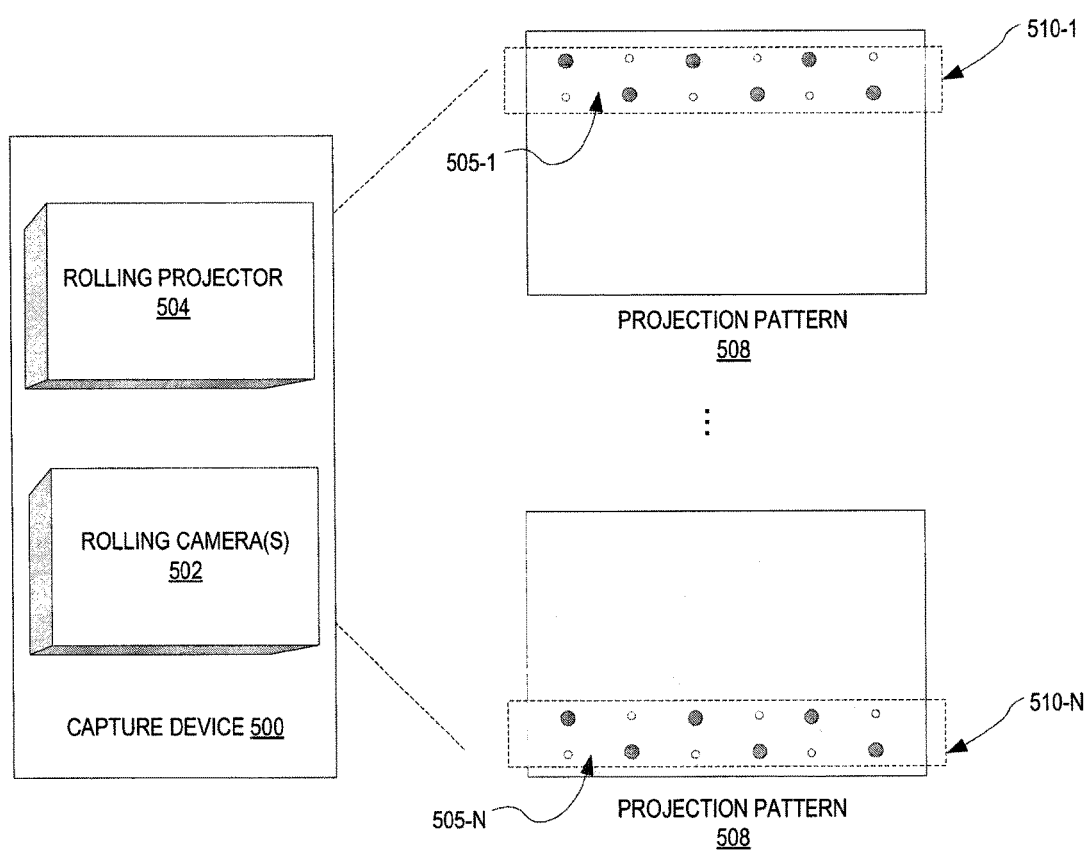
FIG. 5 illustrates one embodiment of a depth camera system with a rolling projector generating sequential portions of a projector pattern and rolling camera(s) exposing corresponding portions of a pixel array.

FIG. 2 is a flow diagram of one embodiment of utilizing a rolling projector in a depth camera system to enhance signal to noise ratio performance. The process is performed by processing logic that may comprise hardware (circuitry, dedicated logic, etc.), software (such as is run on a general purpose computer system or a dedicated machine), firmware, or a combination of these three. In one embodiment, the process may be implemented by capture device 100 of FIG. 1. In another embodiment, the process may also be implemented by a depth camera system 500 of FIG. 5, which includes a rolling projector 504 generating sequential portions 505-1 through 505-N of a projection pattern 508 and rolling camera(s) 502 exposing corresponding portions 510-1 through 510-N of a pixel array.

Referring to FIG. 2, the processing begins by exposing a portion of a pixel array of a rolling camera sensor (processing block 202). In one embodiment, one or more rolling camera(s) 502, such as rolling IR cameras, expose a portion of a pixel array of the CMOS sensor(s), illustrated as block 510-1. The portion exposed by a rolling shutter may have one or more rows of pixels of a CMOS sensor array, and the exposure by the rolling shutter may be from top to bottom of the sensor array. However, other portions of a CMOS sensor array, such as columns, blocks, etc., may also be exposed in a sequential fashion using a rolling shutter until all portions of the rolling camera sensor array are exposed to a scene.

Processing logic activates a portion of a rolling projector to generate a portion of a projection pattern during the exposure of the portion of the pixel array (processing block 204). In one embodiment, the rolling projector 504 is a rolling IR projector that supports burst modes, such as a VCSEL laser projector having a plurality of individually addressable light emission sources and/or groupings of sources that can be selectively activated and/or controlled. The individually addressable nature of the light emission sources and/or groups enables processing logic to selectively activate, for example, a plurality of rows of light emission sources to generate a portion of a projection pattern for depth reconstruction purposes, such as a first portion 505-1 of a projection pattern. Furthermore, activation and/or control enables processing logic to control the power supplied to the VCSEL laser projector to power the portion of the light emission sources that would otherwise have been supplied to the non-activated portion, thereby boosting power and light output levels. However, in one embodiment, the power supplied to the portion of the light emission sources supplied by processing logic does not exceed an eye safety limit power threshold, where the threshold is defined by the maximum power that can be supplied to all of the VCSEL emission sources at one time. For example, suppose the eye safety limit for a maximum power that can be supplied to a VCSEL projector is P, and ⅕ of the VCSEL light emitter array is activated as the selectively activated portion of the rolling projector, then the activated portion could be supplied with P, which is the eye safety limit. However, because the maximum power P is being supplied to ⅕ of the VCSEL array, that portion would emit light with 5 times the power of a fully powered VCSEL array, assuming the same apparent source size for the spot on a projection lens of the VCSEL projector.

Processing logic captures image data for the generated portion of the projection pattern with the exposed portion of the pixel array of the rolling camera sensor (processing block 206). When the projection pattern has not been completed (processing block 208), such as when all portions of the rolling projector have not been activated and/or when all portions of pixel arrays of the rolling camera(s) 502 have not been exposed, the process returns to processing block returns to processing 202 to continue sequentially generating portions of projection patterns, exposing corresponding portions of pixel arrays, and capturing image data for portions of the projection pattern until a final portion 510-N of projection pattern 505-N is captured (processing block 208).

After the projection pattern is captured, depth reconstruction can be performed by a capture device based, at least in part, on the captured image data (processing block 210). In one embodiment, however, depth reconstruction need not wait until all image data from the projection pattern has been captured, and depth reconstruction can be performed on portions of captured image data and combined with other portions of depth reconstruction to reconstruct depth information for a scene.

Figure 6:
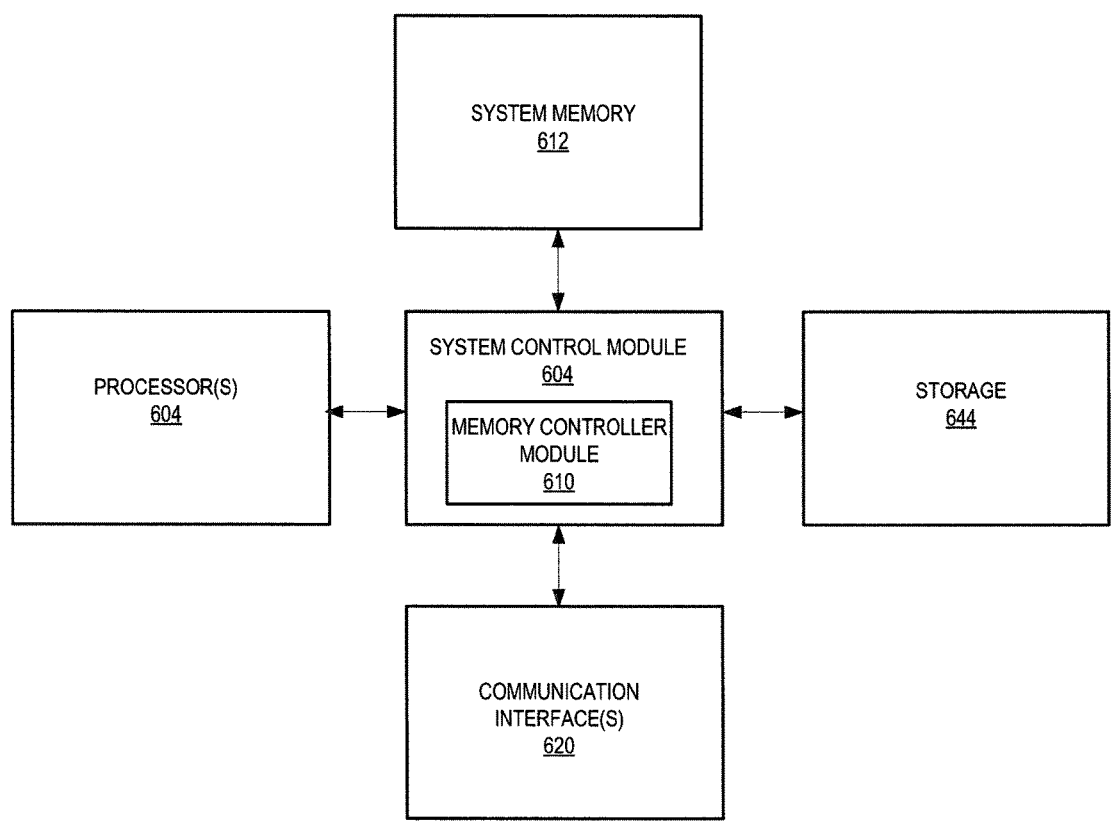
FIG. 6 is a block diagram of one embodiment of a system.

FIG. 6 illustrates, for one embodiment, an example system 600 having one or more processor(s) 604, system control module 608 coupled to at least one of the processor(s) 604, system memory 612 coupled to system control module 608, non-volatile memory (NVM)/storage 614 coupled to system control module 608, and one or more communications interface(s) 620 coupled to system control module 608. In some embodiments, the system 600 may include capture device 100 and provide logic/module that performs functions aimed to capture device 100 calibrations, along with depth reconstruction and other functions, described herein.

In some embodiments, the system 600 may include one or more computer-readable media (e.g., system memory or NVM/storage 614) having instructions and one or more processors (e.g., processor(s) 604) coupled with the one or more computer-readable media and configured to execute the instructions to implement a module to perform depth and texture calibration, along with depth reconstruction and other functions, described herein.

System control module 608 for one embodiment may include any suitable interface controllers to provide for any suitable interface to at least one of the processor(s) 604 and/or to any suitable device or component in communication with system control module 608.

System control module 608 may include memory controller module 610 to provide an interface to system memory 612. The memory controller module 610 may be a hardware module, a software module, and/or a firmware module. System memory 612 may be used to load and store data and/or instructions, for example, for system 600. System memory 612 for one embodiment may include any suitable volatile memory, such as suitable DRAM, for example. System control module 608 for one embodiment may include one or more input/output (I/O) controller(s) to provide an interface to NVM/storage 614 and communications interface(s) 620.

The NVM/storage 614 may be used to store data and/or instructions, for example. NVM/storage 614 may include any suitable non-volatile memory, such as flash memory, for example, and/or may include any suitable non-volatile storage device(s), such as one or more hard disk drive(s)

(HDD(s)), one or more compact disc (CD) drive(s), and/or one or more digital versatile disc (DVD) drive(s), for example. The NVM/storage 614 may include a storage resource physically part of a device on which the system 600 is installed or it may be accessible by, but not necessarily a part of, the device. For example, the NVM/storage 614 may be accessed over a network via the communications interface(s) 620.

Communications interface(s) 620 may provide an interface for system 600 to communicate over one or more network(s) and/or with any other suitable device. The system 600 may wirelessly communicate with the one or more components of the wireless network in accordance with any of one or more wireless network standards and/or protocols.

For one embodiment, at least one of the processor(s) 604 may be packaged together with logic for one or more controller(s) of system control module 608, e.g., memory controller module 610. For one embodiment, at least one of the processor(s) 604 may be packaged together with logic for one or more controllers of system control module 608 to form a System in Package (SiP). For one embodiment, at least one of the processor(s) 604 may be integrated on the same die with logic for one or more controller(s) of system control module 608. For one embodiment, at least one of the processor(s) 604 may be integrated on the same die with logic for one or more controller(s) of system control module 608 to form a System on Chip (SoC).

In various embodiments, the system 600 may have more or less components, and/or different architectures. For example, in some embodiments, the system 600 may include one or more of a camera, a keyboard, liquid crystal display (LCD) screen (including touch screen displays), non-volatile memory port, multiple antennas, graphics chip, application-specific integrated circuit (ASIC), and speakers.

In various implementations, the system 600 may be, but is not limited to, a mobile computing device (e.g., a laptop computing device, a handheld computing device, a tablet, a netbook, etc.), a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 600 may be any other electronic device.

Figure 7:
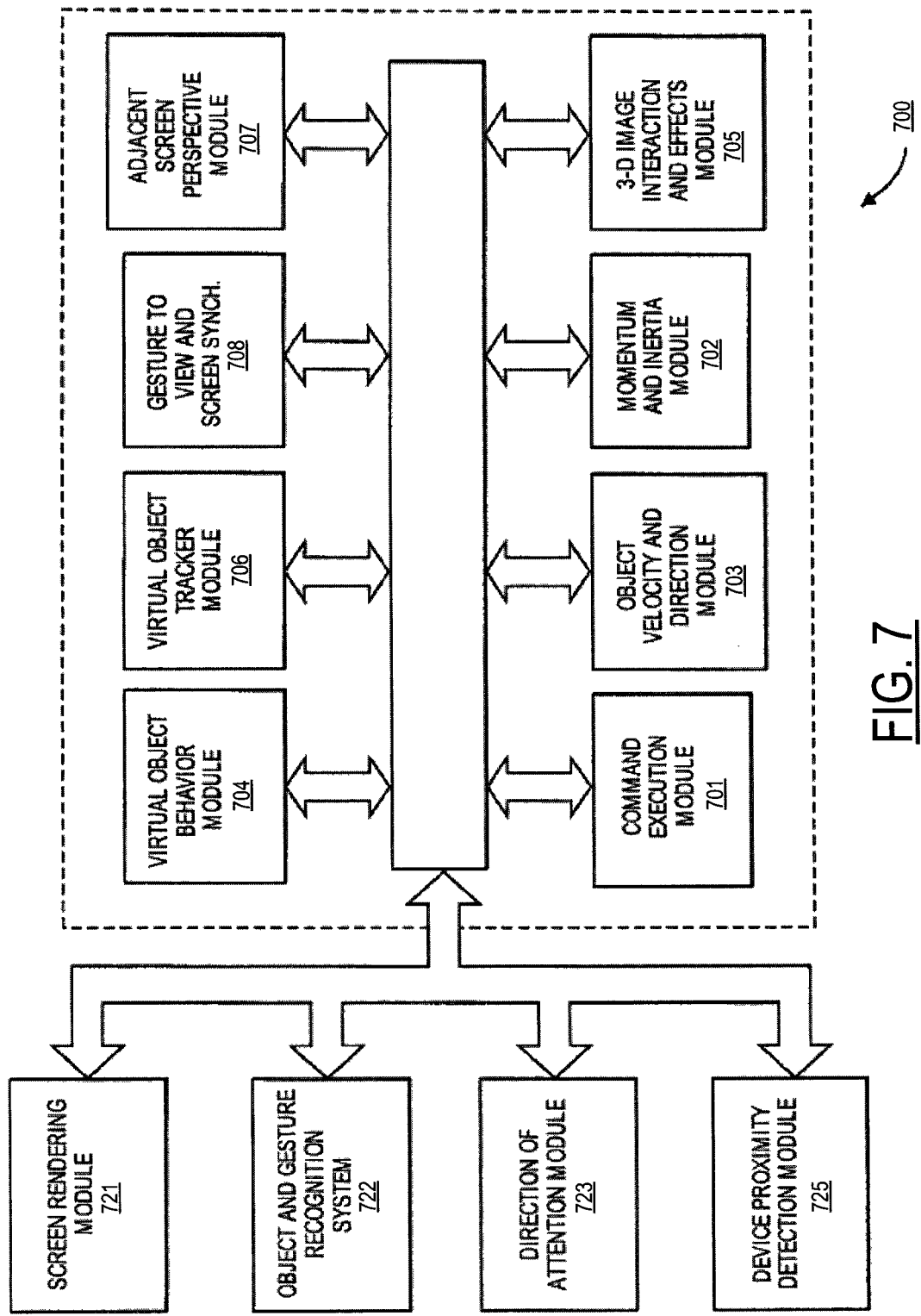
FIG. 7 illustrates an embodiment of a computing environment capable of supporting the operations discussed above.

FIG. 7 illustrates an embodiment of a computing environment 700 capable of supporting the operations discussed above. The modules described before can use the depth information (e.g., values) and other data described above to perform these functions. The modules and systems can be implemented in a variety of different hardware architectures and form factors.

Command Execution Module 701 includes a central processing unit to cache and execute commands and to distribute tasks among the other modules and systems shown. It may include an instruction stack, a cache memory to store intermediate and final results, and mass memory to store applications and operating systems. Command Execution Module 701 may also serve as a central coordination and task allocation unit for the system.

Screen Rendering Module 721 draws objects on the one or more multiple screens for the user to see. It can be adapted to receive the data from Virtual Object Behavior Module 704, described below, and to render the virtual object and any other objects and forces on the appropriate screen or screens. Thus, the data from Virtual Object Behavior Module 704 would determine the position and dynamics of the virtual object and associated gestures, forces and objects, for example, and Screen Rendering Module 721 would depict the virtual object and associated objects and environment on a screen, accordingly. Screen Rendering Module 721 could further be adapted to receive data from Adjacent Screen Perspective Module 707, described below, to either depict a target landing area for the virtual object if the virtual object could be moved to the display of the device with which Adjacent Screen Perspective Module 707 is associated. Thus, for example, if the virtual object is being moved from a main screen to an auxiliary screen, Adjacent Screen Perspective Module 707 could send data to the Screen Rendering Module 721 to suggest, for example in shadow form, one or more target landing areas for the virtual object on that track to a user's hand movements or eye movements.

Object and Gesture Recognition System 722 may be adapted to recognize and track hand and harm gestures of a user. Such a module may be used to recognize hands, fingers, finger gestures, hand movements and a location of hands relative to displays. For example, Object and Gesture Recognition System 722 could for example determine that a user made a body part gesture to drop or throw a virtual object onto one or the other of the multiple screens, or that the user made a body part gesture to move the virtual object to a bezel of one or the other of the multiple screens. Object and Gesture Recognition System 722 may be coupled to a camera or camera array, a microphone or microphone array, a touch screen or touch surface, or a pointing device, or some combination of these items, to detect gestures and commands from the user.

The touch screen or touch surface of Object and Gesture Recognition System 722 may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by Object and Gesture Recognition System 722, using one or more cameras, without the benefit of a touch surface.

Direction of Attention Module 723 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to Object and Gesture Recognition Module 722 to ensure that the gestures or commands are associated with the appropriate library for the active display. Similarly, if the user is looking away from all of the screens, then commands can be ignored.

Device Proximity Detection Module 725 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to Object Gesture and Recognition System 722. For a display device, it may be considered by Adjacent Screen Perspective Module 707.

Virtual Object Behavior Module 704 is adapted to receive input from Object Velocity and Direction Module 703, and to apply such input to a virtual object being shown in the display. Thus, for example, Object and Gesture Recognition System 722 would interpret a user gesture and by mapping the captured movements of a user's hand to recognized movements, Virtual Object Tracker Module 706 would associate the virtual object's position and movements to the movements as recognized by Object and Gesture Recognition System 722, Object and Velocity and Direction Module 703 would capture the dynamics of the virtual object's movements, and Virtual Object Behavior Module 704 would receive the input from Object and Velocity and Direction Module 703 to generate data that would direct the movements of the virtual object to correspond to the input from Object and Velocity and Direction Module 703.

Virtual Object Tracker Module 706 on the other hand may be adapted to track where a virtual object should be located in three-dimensional space in a vicinity of a display, and which body part of the user is holding the virtual object, based on input from Object Gesture and Recognition System 722. Virtual Object Tracker Module 706 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

Gesture to View and Screen Synchronization Module 708, receives the selection of the view and screen or both from Direction of Attention Module 723 and, in some cases, voice commands to determine which view is the active view and which screen is the active screen. It then causes the relevant gesture library to be loaded for Object and Gesture Recognition System 722. Various views of an application on one or more screens can be associated with alternative gesture libraries or a set of gesture templates for a given view.

Adjacent Screen Perspective Module 707, which may include or be coupled to Device Proximity Detection Module 725, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. Adjacent Screen Perspective Module 707 may, in this way, determine coordinates of an adjacent screen relative to its own screen coordinates. Thus, the Adjacent Screen Perspective Module may determine which devices are in proximity to each other, and further potential targets for moving one or more virtual object's across screens. Adjacent Screen Perspective Module 707 may further allow the position of the screens to be correlated to a model of three-dimensional space representing all of the existing objects and virtual objects.

Object and Velocity and Direction Module 703 may be adapted to estimate the dynamics of a virtual object being moved, such as its trajectory, velocity (whether linear or angular), momentum (whether linear or angular), etc. by receiving input from Virtual Object Tracker Module 706. The Object and Velocity and Direction Module 703 may further be adapted to estimate dynamics of any physics forces, by for example estimating the acceleration, deflection, degree of stretching of a virtual binding, etc. and the dynamic behavior of a virtual object once released by a user's body part. Object and Velocity and Direction Module 703 may also use image motion, size and angle changes to estimate the velocity of objects, such as the velocity of hands and fingers Momentum and Inertia Module 702 can use image motion, image size, and angle changes of objects in the image plane or in a three-dimensional space to estimate the velocity and direction of objects in the space or on a display. Momentum and Inertia Module 702 is coupled to Object and Gesture Recognition System 722 to estimate the velocity of gestures performed by hands, fingers, and other body parts and then to apply those estimates to determine momentum and velocities to virtual objects that are to be affected by the gesture.

3D Image Interaction and Effects Module 705 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module 705 in the foreground on one or more of the displays.

In a first example embodiment, a method comprises exposing a portion of a pixel array of a rolling camera sensor, activating a portion of a rolling projector to generate a portion of a projection pattern during the exposure of the portion of the pixel array, capturing image data for the generated portion of the projection pattern with the exposed portion of the pixel array of the rolling camera sensor, and performing depth reconstruction based, at least in part, on the captured image data.

In another example, the method further comprises exposing successive portions of the pixel array of the rolling camera sensor, activating successive portions of the rolling projector corresponding to the successive portions of the pixel array, coordinating the exposure of each successive portion of the pixel array with each successive portion of the rolling projector, and capturing a plurality of image data to obtain depth reconstruction data corresponding to a complete projection pattern.

In another example of the method, the exposed portion of the pixel array comprises one or more rows of pixels of the pixel array, wherein the rolling projector comprises an array of light emission sources, and wherein the activated portion of the rolling projector comprises one or more rows of light emissions sources from the array.

In another example of the method, activating the corresponding portion of the rolling projector comprises activating the portion of the rolling projector while the remainder of the rolling projector is inactive.

In another example, the method further comprises supplying the activated portion of the rolling projector with a threshold level of power.

In another example of the method, the threshold level of power supplied to the portion of the rolling sensor corresponds to a maximum power that can be supplied to all portions of the rolling projector sensor at once.

In another example of the method, the threshold level of power is an eye safety limit power threshold.

In another example of the method, the rolling camera sensor is an infrared rolling camera sensor and the rolling projector is a vertical-cavity surface-emitting laser (VCSEL) integrated with a projection lens.

In another example of the method, the VCSEL projector comprises a plurality of light emission sources, where each light emission source is independently addressable.

In another example, the rolling camera sensor comprises at least two rolling camera sensors to expose corresponding portions of pixel arrays belonging to the at least two rolling camera sensors, wherein each pixel array of the at least two rolling camera sensors captures image data for the generated portion of the projection pattern, and wherein the depth reconstruction is a stereo depth reconstruction.

In a second example embodiment, a system comprises a rolling camera configured to expose a portion of a pixel array of a rolling camera sensor and capture image data for a projection pattern with the exposed portion of the pixel array, a rolling projector configured to activate a portion of the rolling projector to generate a portion of the projection pattern during the exposure of the portion of the pixel array, and a processor configured to perform depth reconstruction based, at least in part, on the captured image data.

In another example, the system further comprises the rolling camera configured to expose successive portions of the pixel array of the rolling camera sensor to capture a plurality of image data to obtain depth reconstruction data corresponding to a complete projection pattern, and the rolling projector configured to activate successive portions of the rolling projector corresponding to the successive portions of the pixel array, wherein the exposure of each successive portion of the pixel array is coordinated with activation of each successive portion of the rolling projector.

In another example of the system, the exposed portion of the pixel array comprises one or more rows of pixels of the pixel array, wherein the rolling projector comprises an array of light emission sources, and wherein the activated portion of the rolling projector comprises one or more rows of light emissions sources from the array.

In another example of the system, the rolling projector configured to activate the corresponding portion of the rolling projector comprises the rolling projector configured to activate the portion of the rolling projector while the remainder of the rolling projector is inactive.

In another example of the system, the activated portion of the rolling projector is supplied with a threshold level of power.

In another example of the system, the threshold level of power supplied to the portion of the rolling sensor corresponds to a maximum power that can be supplied to all portions of the rolling projector sensor at once.

In another example of the system, the threshold level of power is an eye safety limit power threshold.

In another example of the system, the rolling camera sensor is an infrared rolling camera sensor and the rolling projector is a vertical-cavity surface-emitting laser (VCSEL) integrated with a projection lens.

In another example of the system, the VCSEL projector comprises a plurality of light emission sources, where each light emission source is independently addressable.

In another example of the system, the rolling camera sensor comprises at least two rolling camera sensors to expose corresponding portions of pixel arrays belonging to the at least two rolling camera sensors, wherein each pixel array of the at least two rolling camera sensors captures image data for the generated portion of the projection pattern, and wherein the depth reconstruction is a stereo depth reconstruction.

In a third example embodiment, an article of manufacture having one or more non-transitory computer readable storage media storing instructions, which when executed by a system, cause the system to perform a method comprising: exposing a portion of a pixel array of a rolling camera sensor, activating a portion of a rolling projector to generate a portion of a projection pattern during the exposure of the portion of the pixel array, capturing image data for the generated portion of the projection pattern with the exposed portion of the pixel array of the rolling camera sensor, and performing depth reconstruction based, at least in part, on the captured image data.

In another example, the article of manufacture further comprises exposing successive portions of the pixel array of the rolling camera sensor, activating successive portions of the rolling projector corresponding to the successive portions of the pixel array, coordinating the exposure of each successive portion of the pixel array with each successive portion of the rolling projector, and capturing a plurality of image data to obtain depth reconstruction data corresponding to a complete projection pattern.

In another example of the article of manufacture, the exposed portion of the pixel array comprises one or more rows of pixels of the pixel array, wherein the rolling projector comprises an array of light emission sources, and wherein the activated portion of the rolling projector comprises one or more rows of light emissions sources from the array.

In another example of the article of manufacture, activating the corresponding portion of the rolling projector comprises activating the portion of the rolling projector while the remainder of the rolling projector is inactive.

In another example of the article of manufacture, the activated portion of the rolling projector are supplied with a threshold level of power.

In another example of the article of manufacture, the threshold level of power supplied to the portion of the rolling sensor corresponds to a maximum power that can be supplied to all portions of the rolling projector sensor at once.

In another example of the article of manufacture, the threshold level of power is an eye safety limit power threshold.

In another example of the article of manufacture, the rolling camera sensor is an infrared rolling camera sensor and the rolling projector is a vertical-cavity surface-emitting laser (VCSEL) projector.

In another example of the article of manufacture, the VCSEL projector comprises a plurality of light emission sources, where each light emission source is independently activatable.

In another example of the article of manufacture, the rolling camera sensor comprises at least two rolling camera sensors to expose corresponding portions of pixel arrays belonging to the at least two rolling camera sensors, wherein each pixel array of the at least two rolling camera sensors captures image data for the generated portion of the projection pattern, and wherein the depth reconstruction is a stereo depth reconstruction.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "exposing" or "capturing" or "activating" or "performing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
    exposing a portion of a pixel array of a rolling camera sensor;
    activating a portion of a rolling projector corresponding to the exposed portion of the pixel array, while a remainder of the rolling projector is inactive, to generate a portion of a projection pattern during the exposure of the portion of the pixel array, wherein the activated portion of the rolling projector comprises a subset of a plurality of light emission sources of the rolling projector, with a total power supplied to the activated subset of the plurality of light emission sources of the rolling projector satisfying an eye safety limit power threshold that can be supplied to all of the plurality of light emission sources at once;
    capturing image data for the generated portion of the projection pattern with the exposed portion of the pixel array of the rolling camera sensor; and
    performing depth reconstruction based, at least in part, on the captured image data.

2. The method of claim 1, further comprising:
    exposing successive portions of the pixel array of the rolling camera sensor;
    activating successive portions of the rolling projector corresponding to the successive portions of the pixel array;
    coordinating the exposure of each successive portion of the pixel array with each successive portion of the rolling projector; and
    capturing a plurality of image data to obtain depth reconstruction data corresponding to a complete projection pattern.

3. The method of claim 1, wherein the exposed portion of the pixel array comprises one or more rows of pixels of the pixel array, wherein the rolling projector comprises an array of light emission sources, and wherein the activated portion of the rolling projector comprises one or more rows of light emissions sources from the array.

4. The method of claim 1, wherein the rolling camera sensor is an infrared rolling camera sensor and the rolling projector is a vertical-cavity surface-emitting laser (VCSEL) integrated with a projection lens.

5. The method of claim 4, wherein the VCSEL projector comprises the plurality of light emission sources, where each light emission source is independently addressable.

6. The method of claim 1, wherein the rolling camera sensor comprises at least two rolling camera sensors to expose corresponding portions of pixel arrays belonging to the at least two rolling camera sensors, wherein each pixel array of the at least two rolling camera sensors captures image data for the generated portion of the projection pattern, and wherein the depth reconstruction is a stereo depth reconstruction.

7. A system comprising:
    a rolling camera configured to expose a portion of a pixel array of a rolling camera sensor and capture image data for a projection pattern with the exposed portion of the pixel array;

a rolling projector configured to activate a portion of the rolling projector corresponding to the exposed portion of the pixel array, while a remainder of the rolling projector is inactive, to generate a portion of the projection pattern during the exposure of the portion of the pixel array wherein the activated portion of the rolling projector comprises a subset of a plurality of light emission sources of the rolling projector, with a total power supplied to the activated subset of the plurality of light emission sources of the rolling projector satisfying an eye safety limit power threshold that can be supplied to all of the plurality of light emission sources at once; and a processor configured to perform depth reconstruction based, at least in part, on the captured image data.

8. The system of claim 7, further comprising:

the rolling camera configured to expose successive portions of the pixel array of the rolling camera sensor to capture a plurality of image data to obtain depth reconstruction data corresponding to a complete projection pattern; and the rolling projector configured to activate successive portions of the rolling projector corresponding to the successive portions of the pixel array;

wherein the exposure of each successive portion of the pixel array is coordinated with activation of each successive portion of the rolling projector.

9. The system of claim 7, wherein the exposed portion of the pixel array comprises one or more rows of pixels of the pixel array, wherein the rolling projector comprises an array of light emission sources, and wherein the activated portion of the rolling projector comprises one or more rows of light emissions sources from the array.

10. The system of claim 7, wherein the rolling camera sensor is an infrared rolling camera sensor and the rolling projector is a vertical-cavity surface-emitting laser (VCSEL) integrated with a projection lens.

11. The system of claim 7, wherein the rolling camera sensor comprises at least two rolling camera sensors to expose corresponding portions of pixel arrays belonging to the at least two rolling camera sensors, wherein each pixel array of the at least two rolling camera sensors captures image data for the generated portion of the projection pattern, and wherein the depth reconstruction is a stereo depth reconstruction.

12. An article of manufacture having one or more non-transitory computer readable storage media storing instructions, which when executed by a system, cause the system to perform a method comprising:

exposing a portion of a pixel array of a rolling camera sensor;

activating a portion of a rolling projector corresponding to the exposed portion of the pixel array, while a remainder of the rolling projector is inactive, to generate a portion of a projection pattern during the exposure of the portion of the pixel array, wherein the activated portion of the rolling projector comprises a subset of a plurality of light emission sources of the rolling projector, with a total power supplied to the activated subset of the plurality of light emission sources of the rolling projector satisfying an eye safety limit power threshold that can be supplied to all of the plurality of light emission sources at once;

capturing image data for the generated portion of the projection pattern with the exposed portion of the pixel array of the rolling camera sensor; and performing depth reconstruction based, at least in part, on the captured image data.

13. The article of manufacture of claim 12, further comprising:

exposing successive portions of the pixel array of the rolling camera sensor;

activating successive portions of the rolling projector corresponding to the successive portions of the pixel array;

coordinating the exposure of each successive portion of the pixel array with each successive portion of the rolling projector; and capturing a plurality of image data to obtain depth reconstruction data corresponding to a complete projection pattern.

14. The article of manufacture of claim 12, wherein the exposed portion of the pixel array comprises one or more rows of pixels of the pixel array, wherein the rolling projector comprises an array of light emission sources, and wherein the activated portion of the rolling projector comprises one or more rows of light emissions sources from the array.

* * * * *